United States Patent
Felderman et al.

(10) Patent No.: US 9,166,692 B1
(45) Date of Patent: Oct. 20, 2015

(54) NETWORK FABRIC RECONFIGURATION

(71) Applicant: Google Inc., Mountain View, CA (US)

(72) Inventors: Robert Felderman, Portola Valley, CA (US); Abdul Kabbani, Los Gatos, CA (US)

(73) Assignee: Google Inc., Mountain View, CA (US)

( * ) Notice: Subject to any disclaimer, the term of this patent is extended or adjusted under 35 U.S.C. 154(b) by 20 days.

(21) Appl. No.: 14/166,011

(22) Filed: Jan. 28, 2014

(51) Int. Cl.
| | |
|---|---|
| H04J 14/00 | (2006.01) |
| H04B 10/27 | (2013.01) |
| H04L 12/751 | (2013.01) |
| H04L 12/933 | (2013.01) |
| H04Q 11/00 | (2006.01) |
| H04L 12/24 | (2006.01) |
| H04L 12/947 | (2013.01) |

(52) U.S. Cl.
CPC ............. *H04B 10/27* (2013.01); *H04L 41/12* (2013.01); *H04L 45/02* (2013.01); *H04L 49/15* (2013.01); *H04L 49/25* (2013.01); *H04Q 11/0071* (2013.01); *H04Q 2011/009* (2013.01); *H04Q 2011/0052* (2013.01)

(58) Field of Classification Search
CPC ....... H04Q 11/0001–11/0005; H04Q 11/0062; H04Q 11/0066; H04Q 11/0067; H04Q 11/0071; H04Q 2011/0052–2011/0054; H04Q 2011/0073; H04Q 2011/009; H04L 12/2416; H04L 41/12; H04L 45/02; H04L 49/15; H04L 49/25
USPC .............. 398/45–57; 370/254–258, 351–463; 709/220–244
See application file for complete search history.

(56) References Cited

U.S. PATENT DOCUMENTS

| | | | |
|---|---|---|---|
| 6,094,417 A | 7/2000 | Hansen et al. | |
| 6,626,586 B1 | 9/2003 | Jaeger | |
| 6,711,324 B1 | 3/2004 | Zang et al. | |
| 7,606,494 B1 * | 10/2009 | Weston-Dawkes et al. | .... 398/83 |

(Continued)

FOREIGN PATENT DOCUMENTS

WO    WO-2013/091688 A1    6/2013

OTHER PUBLICATIONS

Curtis, et al. Rewire: An Optimization-based Framework for Unstructured Data Center Network Design, IEEE, 9 pages, 2012.
Farrington et al. Helios: A Hybrid Electrical/Optical Switch Architecture for Modular Data Centers, Proceedings of the ACM SIGCOMM Conference, Aug. 30, 2013Sep. 3, 2010, New Delhi, India (12 pages).

(Continued)

*Primary Examiner* — Li Liu
(74) *Attorney, Agent, or Firm* — Edward A. Gordon; Foley & Lardner LLP (57) ABSTRACT

The present disclosure describes systems and methods for reconfiguring the links made by a plurality of optical circuit switches between the nodes of the first layer and the nodes of the second layer that reduces the throughput loss when the network transitions form a first logical topology to a second logical topology. More particularly, the first logical topology is realized by a specific physical topology, while the second logical topology may be realized by one or more physical topologies. The disclosure describes a method for selecting a second physical topology from the one or more physical topologies that will realize the second logical topology while reducing the number of links within each of the optical circuit switches that must be reconfigured (i.e, disconnected from their present ports and reconnected to new ports within the optical circuit switch) to transition from the first to second logical topology.

20 Claims, 7 Drawing Sheets

(56) References Cited

U.S. PATENT DOCUMENTS

| | | | |
|---|---|---|---|
| 7,830,789 | B2 | 11/2010 | Hashiguchi et al. |
| 8,195,784 | B2 | 6/2012 | Smith et al. |
| 8,370,490 | B2 | 2/2013 | Deng et al. |
| 8,660,010 | B2 | 2/2014 | Zolfaghari et al. |
| 2002/0027885 | A1 | 3/2002 | Ben-Ami |
| 2005/0002603 | A9 | 1/2005 | Beshai et al. |
| 2005/0033742 | A1 | 2/2005 | Kamvar et al. |
| 2006/0153496 | A1* | 7/2006 | Tanobe et al. .................. 385/24 |
| 2010/0129078 | A1* | 5/2010 | Weston-Dawkes et al. .... 398/79 |
| 2010/0266281 | A1 | 10/2010 | Wang et al. |
| 2011/0176804 | A1* | 7/2011 | Blinkert et al. ................ 398/45 |
| 2012/0008945 | A1 | 1/2012 | Singla et al. |
| 2012/0128354 | A1 | 5/2012 | Panwar et al. |
| 2012/0182865 | A1 | 7/2012 | Andersen et al. |
| 2013/0083701 | A1* | 4/2013 | Tomic et al. ................ 370/255 |
| 2013/0308444 | A1 | 11/2013 | Sem-Jacobsen et al. |
| 2014/0270762 | A1* | 9/2014 | Li et al. ........................... 398/45 |

OTHER PUBLICATIONS

Thiagarajan et al., "Capacity Fairness of WDM Networks with Grooming Capabilities" OptiComm 2000: Optical Network and Communications, Proceedings of SPIE vol. 4223, Sep. 2000, 11 Pages.

US Notice of Allowance in U.S. Appl. No. 13/904,804 DTD Feb. 2, 2015.

US Notice of Allowance in U.S. Appl. No. 13/904,804 DTD Jun. 11, 2015.

US Notice of Allowance in U.S. Appl. No. 13/872,630 DTD Mar. 23, 2015.

US Office Action in U.S. Appl. No. 13/872,626 DTD Apr. 16, 2015.

US Office Action in U.S. Appl. No. 13/872,626 dated Dec. 8, 2014.

US Office Action in U.S. Appl. No. 13/872,630 dated Nov. 18, 2014.

\* cited by examiner

NETWORK FABRIC RECONFIGURATION

BACKGROUND OF THE DISCLOSURE

Hybrid optical and electrical switches have been suggested to facilitate building modular data centers. However, when the connections maintained by these switches are broken responsive to the expansion of the data center's network, data throughput loss can occur as the connections are reconfigured.

SUMMARY

A according to one aspect of the disclosure, a method for reconfiguring a network includes receiving an indication of a first physical topology of the network that realizes a first logical topology. The physical topology defines the connection of a plurality of nodes in a first layer to a plurality of nodes in a second layer through a plurality of optical circuit switches. The method also includes receiving an indication of a second logical topology to be implemented on the network, and then determining a delta topology. The delta topology includes a set of to-cut links and a set of to-connect links that transforms the first logical topology into the second logical topology. The method includes locating a first decomposable link set in the delta topology within a single optical circuit switch. A decomposable link set includes at least two to-cut links and at least two to-connect links.

The decomposable link set is selected such that when the at least two to-cut links are cut, the corresponding at least two to-connect links can be connected. For the located first decomposable link set, the to-cut links are cut and the to-connect links are connected. Iteratively, one of the remaining to-cut links is shuffled to a target optical circuit switch yielding a shuffled delta topology. Next, a second decomposable link set is located within the shuffled delta topology, wherein each of the links of the second decomposable link set passes through the target optical circuit switch. The to-cut links are cut and their ends are interconnected.

According a second aspect of the disclosure, a system for reconfiguring a network includes a plurality of optical circuit switches and a controller coupled to each of the plurality of optical circuit switches. The controller is configured to receive an indication of a first physical topology of a network realizing a first logical topology, wherein the physical topology defines the connection of a plurality of nodes in a first layer to a plurality of nodes in a second layer through the plurality of optical circuit switches. The controller is also configured to receive an indication of a second logical topology to be implemented on the network, and to determine a delta topology comprising a set of to-cut links and a set of to-connect links to transform the first logical topology to the second logical topology. The controller is also configured to locate a first decomposable link set in the delta topology within a single optical circuit switch of the plurality optical switches. For the located first decomposable link set, the controller cuts the to-cut links and connects the corresponding to-connect links. Then, iteratively, the controller shuffles one of the remaining to-cut links to a target optical circuit switch yielding a shuffled delta topology. The controller then locates a second decomposable link set within the shuffled delta topology and the rotates the second decomposable link set.

According to another aspect of the disclosure, a non-transitory computer readable storage medium having instructions encoded thereon which, when executed by a processor, cause the processor to perform a method. The physical topology defines the connection of a plurality of nodes in a first layer to a plurality of nodes in a second layer through a plurality of optical circuit switches. The method includes receiving an indication of a second logical topology to be implemented on the network, and then determining a delta topology including a set of to-cut links and a set of to-connect links to transform the first logical topology to the second logical topology. The method includes locating a first decomposable link set in the delta topology within a single optical circuit switch of the plurality optical switches. A decomposable link set includes at least two to-cut links and at least two to-connect links. The decomposable link set is selected such that when the at least two to-cut links are cut, the corresponding at least two to-connect links can be connected. For the located first decomposable link set, the to-cut links are cut and the to-connect links are connected. Iteratively, one of the remaining to-cut links is shuffled to a target optical circuit switch yielding a shuffled delta topology. Next, a second decomposable link set is located within the shuffled delta topology, wherein each of the links of the second decomposable link set passes through the target optical circuit switch. The to-cut links are cut and their ends are interconnected.

BRIEF DESCRIPTION OF THE DRAWINGS

The skilled artisan will understand that the figures, described herein, are for illustration purposes only. It is to be understood that in some instances various aspects of the described implementations may be shown exaggerated or enlarged to facilitate an understanding of the described implementations. In the drawings, like reference characters generally refer to like features, functionally similar and/or structurally similar elements throughout the various drawings. The drawings are not necessarily to scale, emphasis instead being placed upon illustrating the principles of the teachings. The drawings are not intended to limit the scope of the present teachings in any way. The system and method may be better understood from the following illustrative description with reference to the following drawings in which.

DETAILED DESCRIPTION

Following below are more detailed descriptions of various concepts related to, and implementations of, systems and methods for reducing throughput loss during the expansion of a computer network. The various concepts introduced above and discussed in greater detail below may be implemented in any of numerous ways, as the described concepts are not limited to any particular manner of implementation. Examples of specific implementations and applications are provided primarily for illustrative purposes.

In some implementations, a datacenter network includes a plurality of optical circuit switches, which provide links between the nodes (or blocks) in the different layers (generally referred to as a first layer and a second layer) of a network. The interconnections between the ports within each optical circuit switch are reprogrammable, enabling the logical connectivity of the datacenter network to be reconfigured without plugging/unplugging cables. In some implementations, during reconfiguration, data throughput loss occurs when the data links passing through an optical circuit switch are temporarily disconnected and reconnected in a new configuration.

The present disclosure describes systems and methods for reconfiguring the links made by a plurality of optical circuit switches between the nodes of the first layer and the nodes of the second layer of a data center to reduce the throughput loss when the network transitions form a first logical topology to a second logical topology. More particularly, the first logical topology is realized by a specific physical topology, while the second logical topology may be realized by one or more physical topologies. The disclosure describes a method for selecting a second physical topology from the one or more physical topologies that will realize the second logical topology, which reduces the number of links within each of the optical circuit switches that must be reconfigured (i.e., disconnected from their present ports and reconnected to new ports within the optical circuit switch) to transition from the first to second logical topology.

Figure 1:
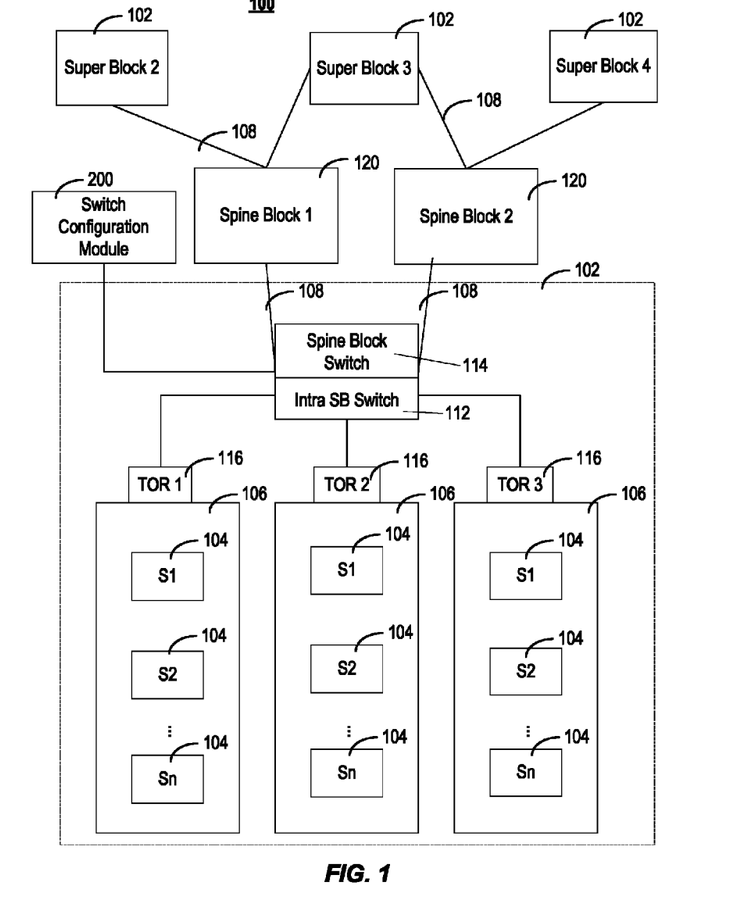
FIG. 1 is a diagram of a data center, according to an illustrative implementation.

FIG. 1 is a block diagram of an example data center 100. The data center 100 includes several interconnected superblocks 102 (also referred to as "pods"). Each superblock 102 may include many hundred, and in some implementations over one thousand, servers 104 arranged in server racks 106. The superblocks 102 are communicatively coupled to one another by optical and/or electrical communication links 108. They can be connected directly, or through spineblocks 120, which serve as switches for routing data communications between the superblocks 102. Each superblock 102 includes an intra-superblock switch 112 for routing communications among the racks 106 included in the superblock 102 or to a spineblock switch 114, which routes data communications between superblocks 102 through spineblocks 120. In some implementations, the spineblock switch 114 can be a spineblock or it can be switch within the superblock 102.

As indicated above, each superblock 102 includes a large number of servers 104. In some implementations, a superblock 102 may include hundreds or more than one thousand servers. The servers 104 are arranged in server racks 106. A top-of-rack switch 116 routes data communications between servers 104 within a given rack 106 and from servers within the rack to the intra-superblock switch 112

The data center 100 also includes a switch configuration system 190 (also referred to as a controller 190). The switch configuration system 190 controls how switches (e.g., optical circuit switches) in the data center 100 connect the superblocks 102 to spineblocks 120. The switch configuration system 190 is configured to implement the methods described herein. For example, the switch configuration system 190 controls the transition from a first logical topology to a second logical topology. In some implementations, the switch configuration system 190 is a component of, or is in communication with, the spineblock switch 114. The components of the switch configuration system 190 can be implemented by special purpose logic circuitry (e.g., an FPGA (field programmable gate array), an ASIC (application-specific integrated circuit)) or a general purpose computing device.

As described above, and more generally referring to FIG. 1, a datacenter network includes a first layer of nodes (e.g., a plurality of super blocks 102) and a second layer of nodes (e.g., a plurality of spine blocks 120). The layers of nodes are interconnected by optical circuit switches. The links provided by the optical circuit switches define the physical topology of the datacenter network and realize a logical topology. A logical topology defines how the nodes communicate across the physical topology created by the optical circuit switches. Different physical topologies may be used to realize the same logical topology. For example, a first level node A may be connected to second level nodes B and C through optical circuit switch 1 or through optical circuit switch 2. In both instances, a logical topology is realized wherein first level node A is connected to second level nodes B and C.

At certain time points, the datacenter network is reconfigured by the switch configuration system 190. For example, the network can be reconfigured during network expansion or to redistribute computational demands. Breaking links during the transition from a first logical topology to a second logical topology adversely effects data throughput. When a plurality of physical topologies can realize the second logical topology, determining and selecting a physical topology that reduces the number of links that are broken during the reconfiguration phase decreases data throughput loss during the reconfiguration phase. The data throughput loss is decreased because fewer links are broken and therefore more data can flow uninterrupted during the reconfiguration process.

Figure 2:
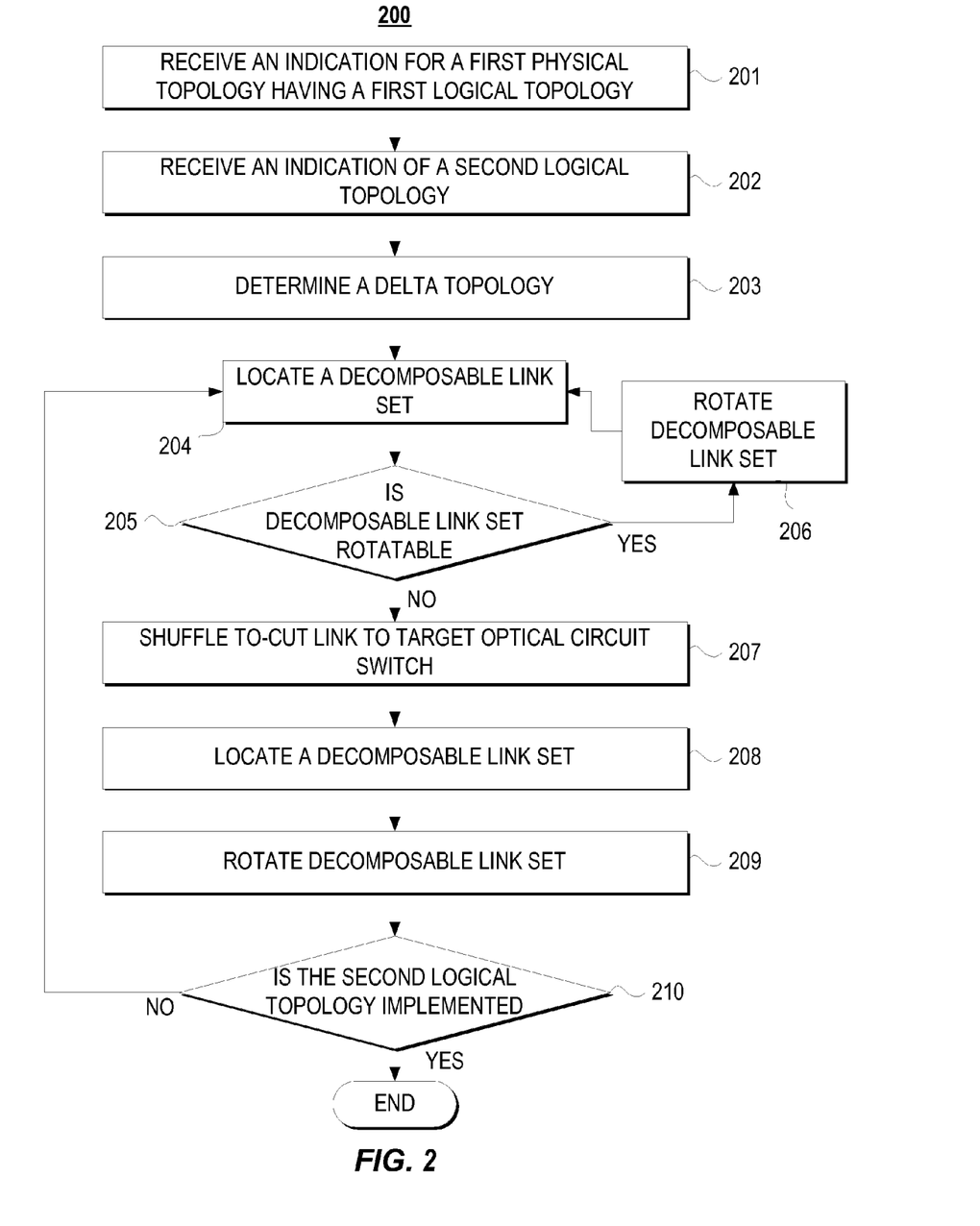
FIG. 2 is a flow chart of an example method for reconfiguring a datacenter network.

FIG. 2 is a flow chart of an example method 200 for reconfiguring a datacenter network. The method 200 includes receiving an indication of a first physical topology (step 201). The method 200 also includes receiving a second logical topology (step 202) and determining a delta topology (step 203). A decomposable link set is located (step 204) and a determination is made if the decomposable link set is rotatable (step 205). If the link set is rotatable, then the link set is rotated (step 206). If the link set is not rotatable, iteratively, a to-cut link is shuffled to a target optical circuit switch (step 207). Another decomposable link set is then found (step 208) and rotated (step 209). The controller determines if the second logical topology is implemented and ends or continues the method responsive to whether the second logical topology has been implemented (step 209).

Figure 3A:
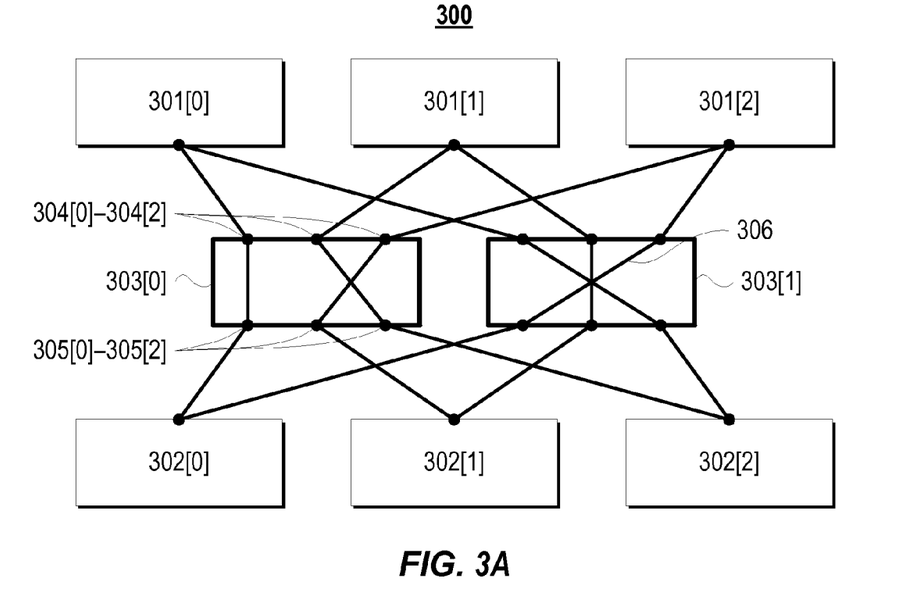
FIG. 3A is a block diagram of an example physical topology of a datacenter network.
Figure 3B:
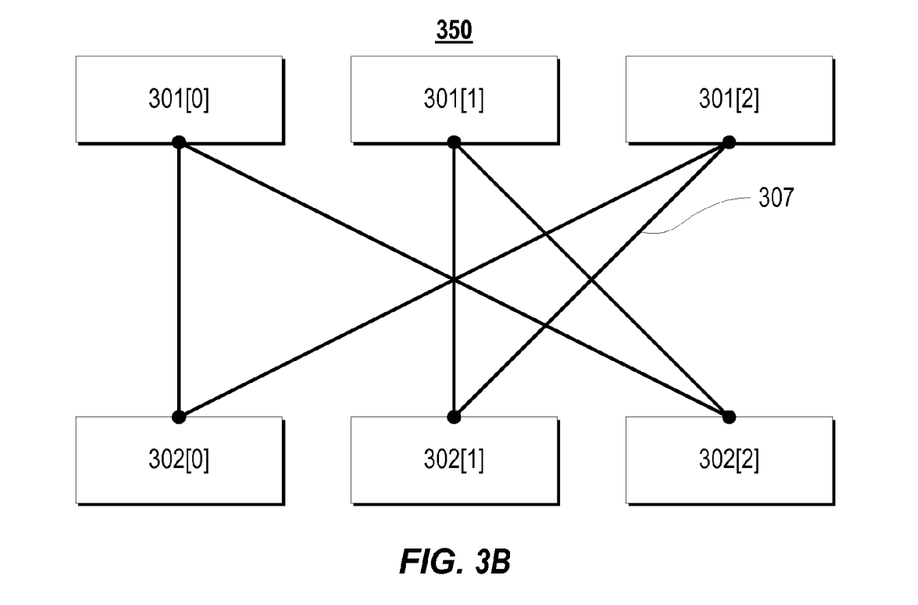
FIG. 3B is a block diagram of an example logical topology realized by the physical topology of FIG. 3A.

As set forth above, and referring to FIGS. 3A and 3B, the method 200 begins with the receipt of an indication of a first physical topology having a first logical topology (step 201). In some implementations, the indication of the physical topology is received by the controller 190. For example, each of the optical circuit switches can report their current configuration to the controller 190, which creates a physical and logical topology for the entire datacenter network.

FIG. 3A is a block diagram of a physical topology 300 of an example datacenter network. The physical topology 300 includes north blocks (NB) 301[0]-301[2] (collectively referred to as NBs 301) and south blocks (SB) 302[0]-302[2] (collectively referred to as SBs 302). The NBs 301 are coupled to the SBs 302 through optical circuit switches (OCS) 303[0] and 303[1] (collectively referred to as OCS 303). Each of the OCS 303 include north ports 304[0]-304[2], to which the NBs 301[0]-301[2] are connected, respectively, and south ports 305[0]-305[2], to which the SBs 302[0]-302[2] are connected, respectively. As an example, and referring back to FIG. 1, the NBs 301 may be equivalent to the spine blocks 120 and the SBs 302 may be equivalent to the super blocks 102 in some implementations. The physical topology (and logical topology) of a datacenter network is determined by the interconnection of the north ports 304 to the south ports 305 within each of the optical circuit switches 303 of the datacenter network. In the physical topology 300, the interconnection of the north ports 304[0]-304[2] to the south ports 305[0]-305[2] are represented by the links 306.

FIG. 3B is a block diagram of the logical topology 350 realized by the physical topology 300. For example, the logical link 307 is the logical representation of the data communication from NB 301[2] to north port 304[2] of OCS 303[1] to south port 305[1] of OCS 303[1] to SB 302[1] in the physical topology 300. In some implementations, a logical topology can be realized by a plurality of physical topologies. For example, if OCS 303[0] and 303[1] were switched, the logical topology 350 would not change.

Figure 4A:
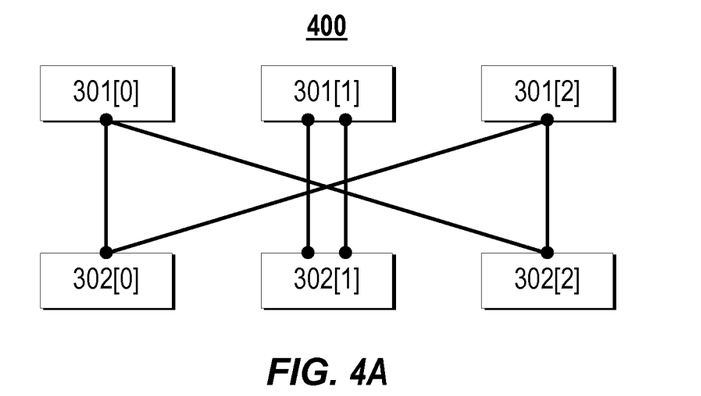
FIG. 4A illustrates an example logical topology to be implemented in the datacenter network illustrating FIG. 2.

Continuing with the example and referring to FIG. 2, the method 200 receives an indication of a second logical topology (step 202). FIG. 4A illustrates an example second logical topology 400, which as explained above, may be realized by a plurality of physical topologies. In some implementations, the controller 190 selects a second logical topology responsive to the communication demands of the nodes in the datacenter network. For example, the controller 190 may implement the second logical topology 400, with a second link between the nodes 301[1] and 302[1], because the controller 190 determined that the nodes 301[1] and 302[1] are jointly involved in communication intensive calculations. In some implementations, the second logical topology may be provided in response to the addition (or loss) of nodes form the datacenter network. In other implementations, a network administrator may provide the second logical topology to the controller 190.

Next, and also referring to FIGS. 3B and 4A, the method 200 includes determining a delta topology (step 203). The delta topology represents the differences (or delta) between the two logical topologies. In order for the datacenter network to transition from the first logical topology 350 to the second logical topology 400, a plurality of links within each of the OCSs 303 are cut and reconnected to form new links. The links to be cut are referred to as to-cut links. The to-cut links are present in the first logical topology 350, but not the second logical topology 400. The new links are referred to as to-connect links. The to-connect links are the links present in the second logical topology 400 that are not present in the first logical topology 350. A delta topology is the superposition of the to-connect links and the to-cut links onto a single logical topology.

Figure 4B:
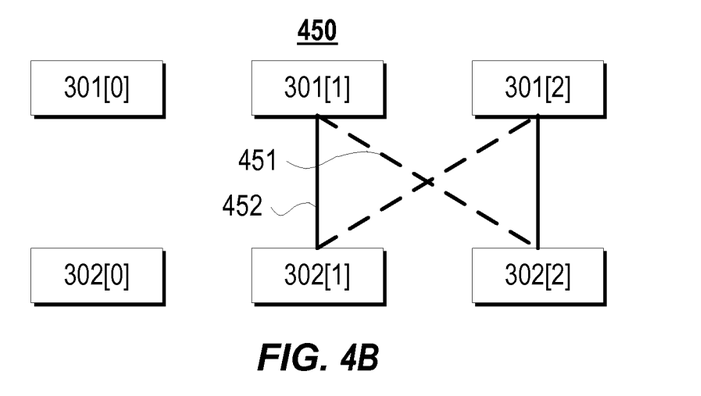
FIG. 4B illustrates the delta topology between the logical topology illustrated in FIG. 3B and the logical topology illustrated in FIG. 4A.

FIG. 4B illustrates the delta topology 450 between the first logical topology 350 and the second logical topology 400. In the delta topology 450, the to-cut links 451 are indicated as dashed lines and the to-connect links 452 are indicated as solid lines.

Referring back to FIG. 2, next, in method 200, a decomposable link set is located (step 204). In some implementations, a delta topology will have at least one decomposable link set. In some implementations, a decomposable link set is a set of to-cut links, which when cut, allow a set of to-connect links to be connected. In some implementations, link sets occur in network topologies when the optical circuit switches 303 have no open ports. They occur, because, without the existence of open ports, a new link cannot be made without cutting at least two of the existing links. In some implementations, a link set includes two links that are to be cut and two link that are to be created. In other implementations, a link set includes one to-cut link and/or one to-connect link. For example, one to-connect link and/or one to-cut link can occur when an optical circuit switch 303 includes free (i.e., open) ports or when port failure occurs. In some implementations, the optical circuit switch 303 may include "dummy" or redundant links that may be cut without needing to be replaced. These implementations, can result in two to-cut links and one to-connect link in a decomposable link set. When the two to-cut links are cut, their ports are interconnected to create the two to-connect links. In some implementations, a link set creates an alternating cycle. In an alternating cycle, each node in the link set connects to one to-cut link and one to-connect link. The delta topology 450 includes one decomposable link set. This decomposable link set encompasses all of the to-cut links 451 and to-connect links 452 of the delta topology 450.

Referring back to FIG. 2 again, the method 200 includes determining if the decomposable link set is rotatable (step 205). Decomposable link sets can be rotatable or non-rotatable. A rotatable link set can be rotated (i.e., the to-cut links can be cut and replaced with the to-connect links within the same optical switch) in the physical topology of the datacenter network, while a non-rotatable link can only be rotated in the logical topology. Rotatable link sets occur when the to-cut and to-connect links of the link set are within a single optical circuit switch, and non-rotatable link sets occur when the to-cut and to-connect links span a plurality of optical circuit switches. For example, if an optical circuit switch includes a plurality of to-cut links, the plurality of to-cut links can be cut and their ports interconnected to form new links. However, if only one to-cut link exists in an optical circuit switch, cutting the to-cut link does not enable a new link to be formed because the optical circuit switch includes no other open ports than those just released by the cutting of the to-cut link (i.e., the only link that can be formed is the same link that was just cut). Dealing with non-rotatable link set is described below in relation to steps 207-210 of method 200.

Figure 4C:
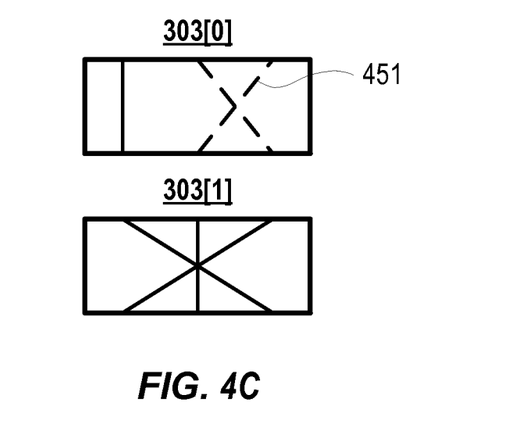
FIG. 4C illustrates the internal link configurations of the optical circuit switches that realize the logical topology illustrated in FIG. 3B.

FIG. 4C illustrates the internal link configurations of the OSC 303[0] and 303[1] that realize the first logical topology 350. As illustrated, the two to-cut links 451 pass through OCS 303[0]. Accordingly, the decomposable link set found in the delta topology 452 is rotatable.

Next, in method 200, the decomposable link set is rotated if the link set is rotatable (step 206). In some implementations, the process of rotating a rotatable link set is controlled by the controller 190. For example, the controller 190 may send instructions to an optical circuit switch for it to disconnect and then reconfigure a plurality of its internal links.

Figure 4D:
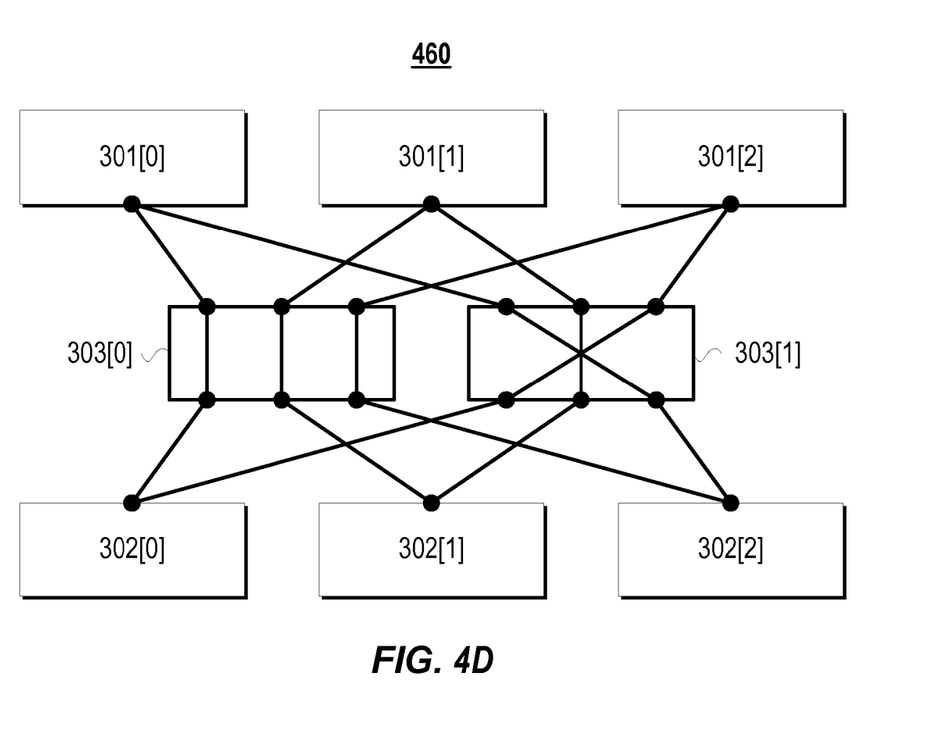
FIG. 4D illustrates the physical topology of the datacenter network after the rotation of a rotatable link set.

FIG. 4D illustrates the physical topology 460 of the datacenter network after the rotation of the rotatable link set. The physical topology 460 realizes the second logical topology 400 illustrated in FIG. 4A.

In some implementations, the initial delta topology may reveal a plurality of rotatable decomposable link sets. The controller 190 may rotate each of the plurality of rotatable decomposable link sets before progressing to step 207 of the method 200. In some implementations, if a plurality of rotatable decomposable link sets exist, the controller 190 ranks the optical circuit switches based on the number of to-cut links in the representative optical circuit switches. The controller 190 then begins rotating the rotatable link sets, starting with the optical circuit switches with the fewest to-cut links and progressing to the optical circuit switches with the most to-cut links. In some implementations, the delta topology is updated each time a link set is rotated.

Once there are no more rotatable decomposable link sets, a to-cut link is shuffled to a target optical circuit switch (step 207). In some implementations, shuffling includes cutting a to-cut link and a link (within the same optical circuit switch as the to-cut link) that does not need to be cut. The open ports in the optical circuit switch are then interconnected. This creates a new to-cut link in a different optical circuit switch. In some implementations, shuffling does not reduce the number of total to-cut links in the delta topology, but rather attempts to create a new rotatable link set.

Figure 5A:
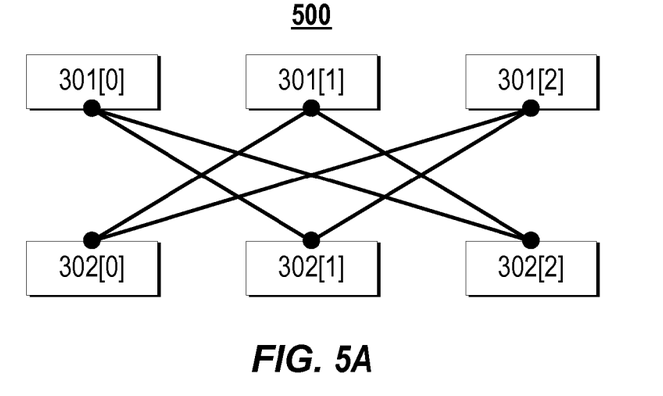
FIG. 5A illustrates a logical topology.
Figure 5B:
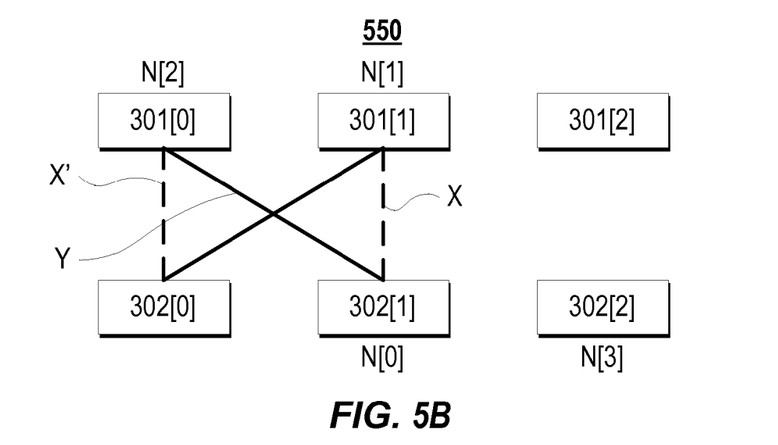
FIG. 5B illustrates the delta topology between the logical topology illustrated in FIG. 5A and the logical topology illustrated in FIG. 3B.
Figure 5C:
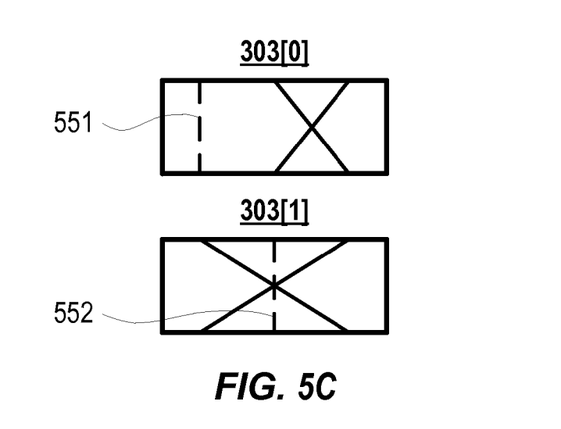
FIG. 5C illustrates the distribution of the to-cut links in each of the optical circuit switches.

FIGS. 5A-5G begin a new example and are used to illustrate an example of shuffling a to-cut link to a target optical circuit switch. FIG. 5A illustrates a logical topology 500. FIG. 5B illustrates the delta topology 550 between the logical topology 500 and the logical topology 350 illustrated in FIG. 3B. FIG. 5C illustrates the internal links of the OSC 303 and illustrates that one of the to-cut links in the delta topology 550 is within the OSC 303[0] and one is within OSC 303[1]. The to-cut links 551 and 552 are indicated by the dashed lines. The link set represented in the logical topology 550 is logically rotatable; however, the link set is not physically rotatable. As described above, the link set is not physically rotatable because after breaking the to-cut links 551 and 552, the port 304[0] of OSC 303[0] cannot be connected to the port 305[1] of the OSC 303[1], and the port 304[1] of the OSC 303[1] cannot be connected to the port 305[0] of the OSC 303[0]. In some implementations, to physically rotate the link set, two to-cut links need to be shuffled to the same OSC 303. In general, shuffling a to-cut link cuts the to-cut link, but creates a new to-cut link in a different OSC 303.

In some implementations, to shuffle a to-cut link, a to-cut link (denoted a X) within a non-rotatable link set is selected to shuffle to the target OSC. The target OCS is the OCS to which the to-cut link will be shuffled. As described above, decomposable link sets include at least two to-cut links. The target OCS is the optical circuit switch through which the other to-cut link of the non-rotatable link set passes. In this example, OCS 303[0] is the target OCS and to-cut link 552 is the to-cut link to be shuffled. The to-cut link passing through the target OCS is denoted as X'. As illustrated in FIG. 5C, X' is to-cut link 552. The to-connect link between X and X' in the delta topology is denoted by Y. In some implementations, Y is a to-connect link within the delta topology that resides in the same optical circuit switch as X. The node connecting X and Y is denoted by n[0] (here SB 302[1]). The other node connected to X is denoted as n[1] (here NB 301[1]). The node connecting X' and Y is denoted by n[2] (here BN 301[0]) and the other end node of the link connected to both links, X' and Y is denoted by n[3] (SB 302[2]). The link between n[2] and n[3] is the link that is not a to-cut link but will be cut such that the to-cut link can be shuffled to the target OCS.

Figure 5D:
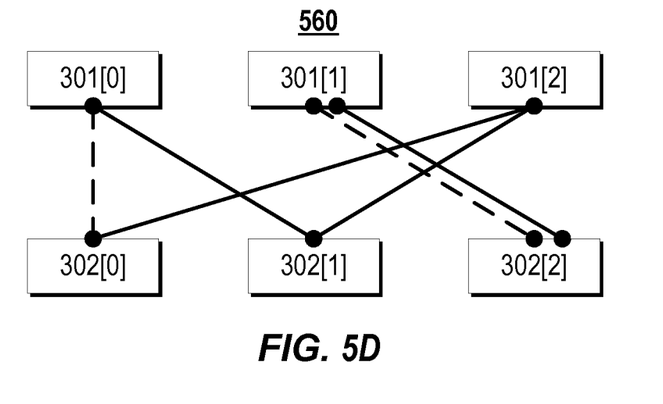
FIG. 5D illustrates the logical topology of the datacenter network after the shuffling of a to-cut link.

In some implementations, the to-cut link is shuffled by cutting the links X and the link between n[2] and n[3] and then interconnecting the open ports. Interconnecting the open ports implements link Y and a new link between n[3] and n[1] in the physical topology. In some implementations, link Y was one of the to-connect links that existed in the delta topology and the new link between n[3] and n[1] is a link that duplicates a link within the target OCS enabling the new duplicate link in the target OCS to be cut. FIG. 5D illustrates the logical topology 560 after the links in the OSC 303[1] have been cut and reconnected. As illustrated, two links now exist between 301[1] and 302[2]. Accordingly, the NB 301[1] SB 302[2] link that passes through OCS 303[0] becomes a to-cut link as the logical topology 500 does not require two links between NB 301[1] and SB 302[2]. Thus, the process transferred a to-cut link to the target OCS (OCS 303[1]). The to-cut links in the logical topology 560 are represented by dashed lines.

Figure 5E:
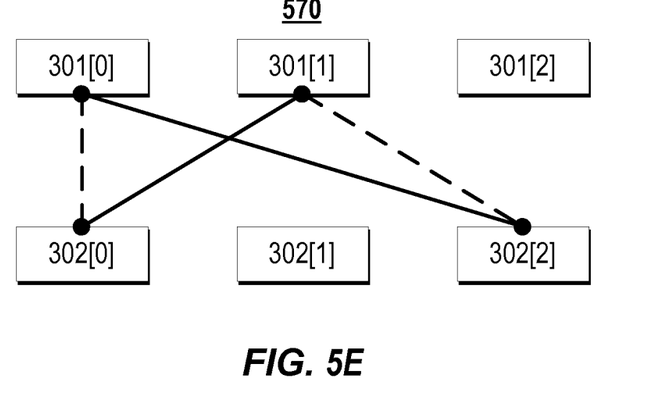
FIG. 5E illustrates the delta topology between the logical topology illustrated in FIG. 5A and the shuffled logical topology illustrated in 5D.

In some implementations, after shuffling a link to the target OCS, the delta topology is updated. FIG. 5E illustrates the delta topology between the second logical topology 500 and the shuffled logical topology 560.

Figure 5F:
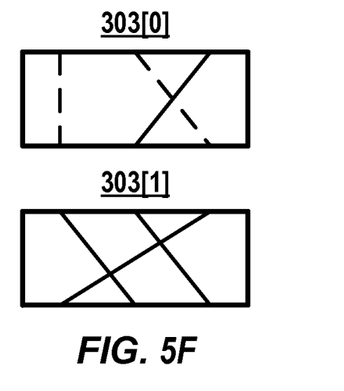
FIG. 5F illustrates the location of the to-cut links in the decomposable link set of the logical topology illustrated in 5E.

Referring to the method 200 of FIG. 2, after the to-cut link is shuffled, a new decomposable link set is found (step 208). The logical topology 570 only includes one decomposable link set. FIG. 5F illustrates the location of the to-cut links in the decomposable link set of the logical topology 570. FIG. 5F illustrates that both to-cut links within the logical topology 570 occur within the OCS 303[0]. Therefore the new link set is rotatable.

Figure 5G:
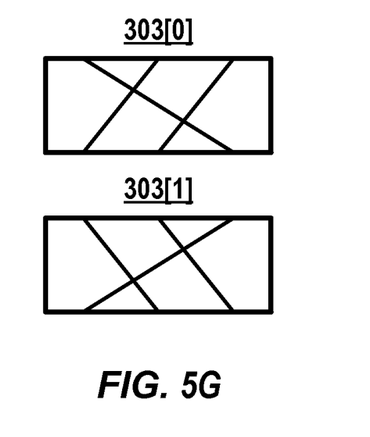
FIG. 5G, illustrates the internal links of the optical circuit switches after the new link set is rotated.

After a new rotatable link set is found, the link set is rotated (step 209). As described above, in relation to step 206, the rotatable link set is rotated by cutting the to-cut links and interconnecting their ports. FIG. 5G, illustrates the internal links of the OSCs 303 after the new link set has been rotated.

Next, the method 200 checks to determine if the second topology is implemented (step 210). Referring again to FIG. 5G, the OSC configurations realize the second topology. Thus the method ends. In a more complex example, a plurality of rotatable or non-rotatable link sets may still exist after step 208. In these implementations, the controller 200 returns to step 207, to iteratively shuffle to-cut links and rotate link sets as described above. In some ims, the controller may return to step 204 to determine if another rotatable link set was created after step 209.

Implementations of the subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, i.e., one or more modules of computer program instructions, encoded on one or more computer storage media for execution by, or to control the operation of, data processing apparatus.

A computer readable medium can be, or be included in, a computer-readable storage device, a computer-readable storage substrate, a random or serial access memory array or device, or a combination of one or more of them. Moreover, while a computer readable medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer readable medium is tangible and non-transitory.

The operations described in this specification can be performed by a data processing apparatus on data stored on one or more computer-readable storage devices or received from other sources. The term "data processing apparatus" or "computing device" encompasses all kinds of apparatus, devices, and machines for processing data, including by way of example a programmable processor, a computer, a system on a chip, or multiple ones, or combinations of the foregoing The apparatus can include special purpose logic circuitry, e.g., an FPGA (field programmable gate array) or an ASIC. The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

Processors suitable for the execution of a computer program include, by way of example, both general and special purpose microprocessors, and any one or more processors of any kind of computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices.

While this specification contains many specific implementation details, these should not be construed as limitations on the scope of any inventions or of what may be claimed, but rather as descriptions of features specific to particular implementations of particular inventions. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated in a single product or packaged into multiple products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed:

1. A method for reconfiguring a network:
receiving an indication of a first physical topology of a network realizing a first logical topology, wherein the physical topology defines the connection of a plurality of nodes in a first layer to a plurality of nodes in a second layer through a plurality of optical circuit switches;
receiving an indication of a second logical topology to be implemented on the network;
determining a delta topology comprising a set of to-cut links and a set of to-connect links to transform the first logical topology to the second logical topology;
locating a first decomposable link set in the delta topology within a single optical circuit switch of the plurality optical switches, wherein a decomposable link set includes at least two to-cut links and at least two to-connect links, selected such that when the at least two to-cut links are cut, the corresponding at least two to-connect links can be connected;
for the located first decomposable link set, cutting the to-cut links and connecting the corresponding to-connect links;
iteratively:
shuffling one of the remaining to-cut links to a target optical circuit switch yielding a shuffled delta topology;
locating a second decomposable link set within the shuffled delta topology, wherein each of the links of the second decomposable link set passes through the target optical circuit switch; and
for the second located link set, cutting the to-cut links and interconnecting the ends of the cut to-links.

2. The method of claim 1, further comprising updating the delta topology after cutting the to-cut links and connecting the corresponding to-connect links for the located first decomposable link set.

3. The method of claim 1, further comprising iteratively updating the shuffled delta topology after cutting the to-cut links and connecting the corresponding to-connect links for the located second decomposable link set.

4. The method of claim 1, wherein each of the first decomposable link set and the second decomposable link set comprise two to-cut links and two to-connect links.

5. The method of 1, wherein shuffling one of the remaining to-cut links to a target optical circuit switch comprises cutting a link not within the delta topology.

6. The method of claim 1, wherein interconnecting the ends of the cut to-links creates one of the to-connect links from the delta topology.

7. The method of claim 1, wherein the one of the remaining to-cut links to a target optical circuit switch is one hop away from a second remaining to-cut link that is in the target optical circuit switch.

8. A system for reconfiguring a network, the system comprising:
- a plurality of optical circuit switches; and
- a controller coupled to each of the plurality of optical circuit switches, the controller configured to:
  - receive an indication of a first physical topology of a network realizing a first logical topology, wherein the physical topology defines the connection of a plurality of nodes in a first layer to a plurality of nodes in a second layer through the plurality of optical circuit switches;
  - receive an indication of a second logical topology to be implemented on the network;
  - determine a delta topology comprising a set of to-cut links and a set of to-connect links to transform the first logical topology to the second logical topology;
  - locate a first decomposable link set in the delta topology within a single optical circuit switch of the plurality optical switches, wherein a decomposable link set includes at least two to-cut links and at least two to-connect links, selected such that when the at least two to-cut links are cut, the corresponding at least two to-connect links can be connected;
  - for the located first decomposable link set, cut the to-cut links and connect the corresponding to-connect links;
  - iteratively:
    - shuffle one of the remaining to-cut links to a target optical circuit switch yielding a shuffled delta topology;
    - locate a second decomposable link set within the shuffled delta topology, wherein each of the links of the second decomposable link set passes through the target optical circuit switch; and
    - for the second located link set, cut the to-cut links and interconnect the ends of the cut to-links.

9. The system of claim 8, wherein the controller is further configured to update the delta topology after cutting the to-cut links and connecting the corresponding to-connect links for the located first decomposable link set.

10. The system of claim 8, wherein the controller is further configured to iteratively update the shuffled delta topology after cutting the to-cut links and connecting the corresponding to-connect links for the located second decomposable link set.

11. The system of claim 8, wherein each of the first decomposable link set and the second decomposable link set comprise two to-cut links and two to-connect links.

12. The system of claim 8, wherein the controller is further configured to shuffle one of the remaining to-cut links to a target optical circuit switch by cutting a link not within the set of to-cut links of the delta topology.

13. The system of claim 8, wherein the controller is further configured to interconnect the ends of the cut to-cut links to create one of the to-connect links in the delta topology.

14. The system of claim 8, wherein the one of the remaining to-cut links to a target optical circuit switch is one hop away from a second remaining to-cut link that is in the target optical circuit switch.

15. A non-transitory computer readable storage medium having instructions encoded thereon which, when executed by a processor, cause the processor to perform a method, the method comprising:
- receiving an indication of a first physical topology of a network realizing a first logical topology, wherein the physical topology defines the connection of a plurality of nodes in a first layer to a plurality of nodes in a second layer through a plurality of optical circuit switches;
- receiving an indication of a second logical topology to be implemented on the network;
- determining a delta topology comprising a set of to-cut links and a set of to-connect links to transform the first logical topology to the second logical topology;
- locating a first decomposable link set in the delta topology within a single optical circuit switch of the plurality optical switches, wherein a decomposable link set includes at least two to-cut links and at least two to-connect links, selected such that when the at least two to-cut links are cut, the corresponding at least two to-connect links can be connected;
- for the located first decomposable link set, cutting the to-cut links and connecting the corresponding to-connect links;
- iteratively:
  - shuffling one of the remaining to-cut links to a target optical circuit switch yielding a shuffled delta topology;
  - locating a second decomposable link set within the shuffled delta topology, wherein each of the links of the second decomposable link set passes through the target optical circuit switch; and
  - for the second located link set, cutting the to-cut links and interconnecting the ends of the cut to-links.

16. The non-transitory computer readable storage medium of claim 15, wherein the method further comprises updating the delta topology after cutting the to-cut links and connecting the corresponding to-connect links for the located first decomposable link set.

17. The non-transitory computer readable storage medium of claim 15, wherein the method further comprises iteratively updating the shuffled delta topology after cutting the to-cut links and connecting the corresponding to-connect links for the located second decomposable link set.

18. The non-transitory computer readable storage medium of claim 15, wherein shuffling one of the remaining to-cut links to a target optical circuit switch comprises cutting a link not within the delta topology.

19. The non-transitory computer readable storage medium of claim 15, wherein interconnecting the ends of the cut to-links creates one of the to-connect links from the delta topology.

20. The non-transitory computer readable storage medium of claim 15, wherein the one of the remaining to-cut links to a target optical circuit switch is one hop away from a second remaining to-cut link that is in the target optical circuit switch.

* * * * *